(12) United States Patent
Kulhawik et al.

(10) Patent No.: US 12,337,728 B2
(45) Date of Patent: *Jun. 24, 2025

(54) VEHICLE SEATING SYSTEM

(71) Applicant: Ford Global Technologies, LLC, Dearborn, MI (US)

(72) Inventors: Benjamin Kulhawik, Canton, MI (US); Antonio Del Puerto, Royal Oak, MI (US); Ryan John Craig, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,508

(22) Filed: Sep. 27, 2023

(65) Prior Publication Data

US 2024/0017644 A1  Jan. 18, 2024

Related U.S. Application Data

(63) Continuation of application No. 17/115,889, filed on Dec. 9, 2020, now Pat. No. 11,801,776.

(51) Int. Cl.
*B60N 2/02* (2006.01)
*B60K 35/00* (2006.01)
(Continued)

(52) U.S. Cl.
CPC ............ *B60N 2/0244* (2013.01); *B60K 35/00* (2013.01); *B60N 2/16* (2013.01); *B60N 2/22* (2013.01);
(Continued)

(58) Field of Classification Search
CPC .......... B60N 2/0244; B60N 2/90; B60N 2/16; B60N 2/22; B60N 2002/981; B60N 2002/0272; G08B 7/06; B60K 35/00; B60K 2370/157; B60K 2370/178; B60R 11/00; B60R 2011/0012; B60R 2011/0089
(Continued)

(56) References Cited

U.S. PATENT DOCUMENTS 5,722,726 A * 3/1998 Matsumiya ............ B60N 2/646
297/341
6,036,266 A * 3/2000 Massara ............... B60N 2/1878
297/DIG. 8
(Continued)

FOREIGN PATENT DOCUMENTS

DE          102013224784 A1    6/2014

*Primary Examiner* — Zhen Y Wu
(74) *Attorney, Agent, or Firm* — Vichit Chea; Price Heneveld LLP

(57) ABSTRACT

A vehicle seating system includes a seatback pivotally coupled to a seat base. The seatback is operable between an upright position and a reclined position. A lift assembly is operably coupled to the seat base. The lift assembly is operable between a disengaged position and an engaged position. A position sensor is coupled to the lift assembly via a ball joint, wherein the ball joint and the position sensor adjust with movement of the lift assembly. A seat controller communicatively is coupled to the position sensor, wherein the seat controller determines if the lift assembly is in the disengaged position or has moved to the engaged position based on position data received from the position sensor.

19 Claims, 12 Drawing Sheets

(51) Int. Cl.
*B60N 2/16* (2006.01)
*B60N 2/22* (2006.01)
*B60N 2/90* (2018.01)
*G08B 7/06* (2006.01)
*B60K 35/26* (2024.01)
*B60K 35/28* (2024.01)
*B60R 11/00* (2006.01)

(52) U.S. Cl.
CPC ................ *B60N 2/90* (2018.02); *G08B 7/06* (2013.01); *B60K 35/26* (2024.01); *B60K 35/28* (2024.01); *B60K 2360/178* (2024.01); *B60N 2/0272* (2023.08); *B60N 2002/981* (2018.02); *B60N 2210/14* (2023.08); *B60R 11/00* (2013.01); *B60R 2011/0012* (2013.01); *B60R 2011/0089* (2013.01)

(58) Field of Classification Search
USPC ......................................................... 340/441
See application file for complete search history.

(56) References Cited

U.S. PATENT DOCUMENTS

| | | | |
|---|---|---|---|
| 6,039,399 A * | 3/2000 | Whalen | B60N 2/232 297/363 |
| 7,758,124 B2 * | 7/2010 | Kojima | B60N 2/206 297/378.12 |
| 8,348,339 B2 | 1/2013 | Onuma et al. | |
| 9,084,004 B2 * | 7/2015 | Rawlinson | G09G 3/20 |
| 9,168,848 B2 * | 10/2015 | Line | B60N 2/02246 |
| 9,994,125 B2 * | 6/2018 | Magaña | B60N 2/0273 |
| 10,232,740 B1 * | 3/2019 | Jaradi | B60N 2/22 |
| 10,327,969 B2 * | 6/2019 | Galonska | A61G 5/04 |
| 11,130,429 B2 * | 9/2021 | Ohno | B60N 2/42745 |
| 11,142,105 B2 * | 10/2021 | Cha | B60N 2/015 |
| 11,299,044 B2 * | 4/2022 | Tanabe | B60N 2/75 |
| 11,648,853 B2 * | 5/2023 | Fu | B60R 22/48 297/217.2 |
| 2004/0075404 A1 * | 4/2004 | Gerding | B60N 2/0244 318/55 |
| 2005/0200184 A1 * | 9/2005 | Siegrist | B60N 2/2356 297/354.12 |
| 2007/0096668 A1 | 5/2007 | Gerding et al. | |
| 2007/0154192 A1 * | 7/2007 | Schneider | H02P 6/182 388/827 |
| 2010/0212628 A1 * | 8/2010 | Li | F16K 31/046 123/339.14 |
| 2010/0259081 A1 * | 10/2010 | Kuno | B60N 2/2209 297/284.4 |
| 2014/0225409 A1 * | 8/2014 | Nagura | B60N 2/236 297/354.1 |
| 2015/0130240 A1 * | 5/2015 | Hozumi | B60N 2/16 297/340 |
| 2016/0023525 A1 * | 1/2016 | Lavoie | B60D 1/305 701/70 |
| 2016/0318442 A1 * | 11/2016 | James | B60Q 9/00 |
| 2017/0225591 A1 * | 8/2017 | Tobata | B60N 2/10 |
| 2018/0201162 A1 * | 7/2018 | Sasaki | B60N 2/2222 |
| 2018/0244174 A1 * | 8/2018 | Tan | B60N 2/0027 |
| 2019/0193592 A1 * | 6/2019 | Tarui | B60N 2/18 |
| 2019/0359093 A1 * | 11/2019 | Nishide | B60N 2/0228 |
| 2020/0079255 A1 * | 3/2020 | Ohno | B60N 2/42745 |
| 2020/0094776 A1 * | 3/2020 | Ohno | B60R 22/34 |
| 2020/0189419 A1 * | 6/2020 | Lee | B60N 2/0228 |
| 2021/0061138 A1 * | 3/2021 | Mahindrakar | B60N 2/914 |
| 2021/0070199 A1 * | 3/2021 | Matha | B60N 2/02246 |
| 2021/0261021 A1 * | 8/2021 | Kral | B60N 2/0284 |
| 2022/0009382 A1 * | 1/2022 | Leighton | B60N 2/90 |

\* cited by examiner

VEHICLE SEATING SYSTEM

CROSS-REFERENCE TO RELATED APPLICATION

The present application is a continuation of U.S. patent application Ser. No. 17/115,889 filed Dec. 9, 2020, now U.S. Pat. No. 11,801,776, entitled VEHICLE SEATING SYSTEM, the entire disclosure of which is hereby incorporated herein by reference.

FIELD OF THE DISCLOSURE

The present disclosure generally relates to a seating system. More specifically, the present disclosure relates to a seating system for a vehicle.

BACKGROUND OF THE DISCLOSURE

Many vehicles include seats that recline. A seatback may be pivotally coupled to a seat base to adjust between different reclined positions.

SUMMARY OF THE DISCLOSURE

According to at least one aspect of the present disclosure, a vehicle seating system includes a seatback pivotally coupled to a seat base. The seatback is operable between an upright position and a reclined position. A lift assembly is operably coupled to the seat base. The lift assembly is operable between a disengaged position and an engaged position. A position sensor is coupled to the lift assembly via a ball joint. The ball joint and the position sensor adjust with movement of the lift assembly. A seat controller is communicatively coupled to the position sensor. The seat controller determines if the lift assembly is in the disengaged position or has moved to the engaged position based on position data received from the position sensor.

According to another aspect of the present disclosure, a seat system for a vehicle includes at least one lift assembly operable between a disengaged position and an engaged position. At least one position sensor is coupled to the at least one lift assembly to sense a position of the at least one lift assembly. The at least one position sensor is adjusted with adjustment of the lift assembly. A seat controller is communicatively coupled with the at least one position sensor. The seat controller determines a position of the at least one lift assembly in response to position data received from the at least one position sensor and a vehicle speed. The seat controller communicates an alert signal when the vehicle speed is at or above a predetermined speed threshold and the at least one lift assembly is in the engaged position.

According to another aspect of the present disclosure, a method of alerting a passenger of seat positioning includes rotating a seatback to a predetermined angle and adjusting a lift assembly from a first position to a second position when the seatback reaches the predetermined angle. A position of a position sensor coupled to the lift assembly is sensed. Whether the lift assembly is in the second position is determined. A vehicle speed is determined. At least one of a visual alert and an audible alert is provided when the lift assembly is in the second position and the vehicle speed is at or above a predetermined speed threshold.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
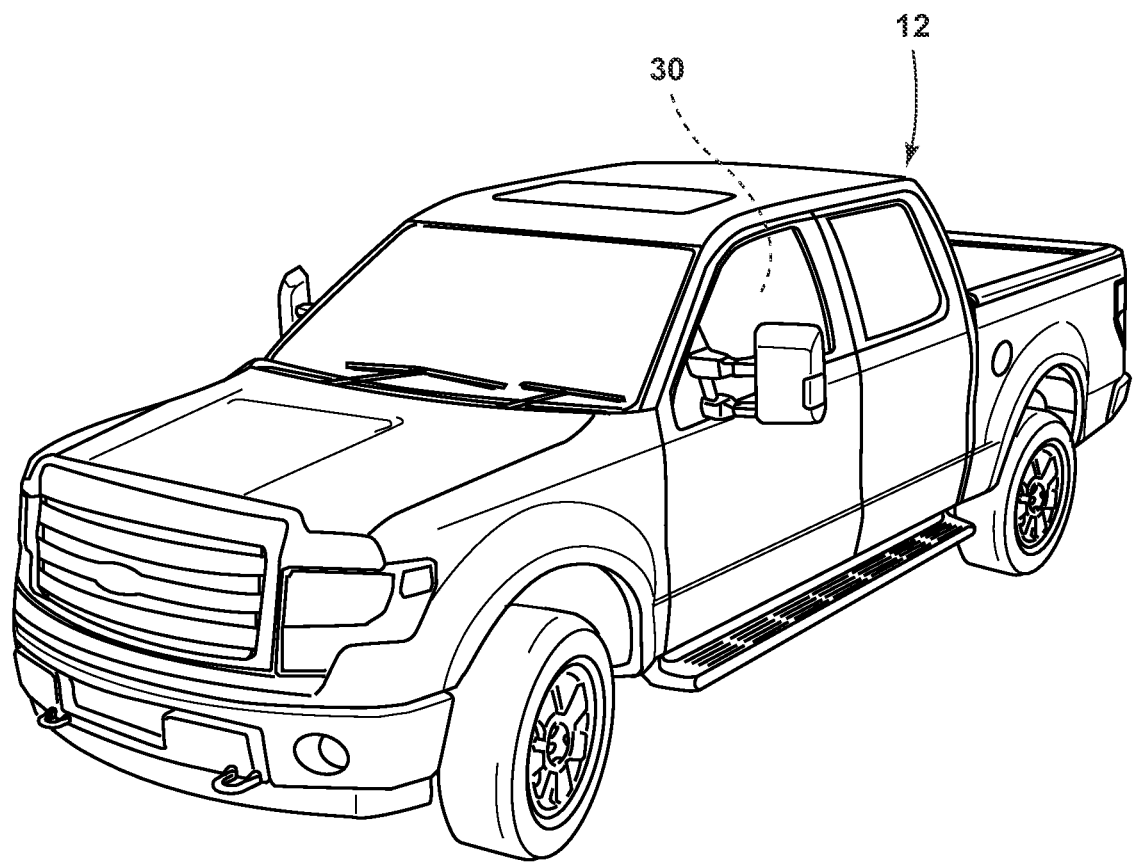
FIG. 1 is a front perspective view of a vehicle incorporating a vehicle system of the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-15, reference numeral 10 generally refers to a seating system for a vehicle 12 that includes a seatback 14 pivotally coupled to a seat base 16. The seatback 14 is operable between an upright position and a reclined position. A lift assembly 18 is operably coupled to the seat base 16. The lift assembly 18 is operable between a disengaged position and an engaged position. A position sensor 20 is coupled to the lift assembly 18 via a ball joint 22. The ball joint 22 and the position sensor 20 adjust with movement of the lift assembly 18. A seat controller 24 is communicatively coupled to the position sensor 20. The seat controller 24 determines if the lift assembly 18 is in the disengaged position or has moved to the engaged position based on position data received from the position sensor 20

Figure 2:
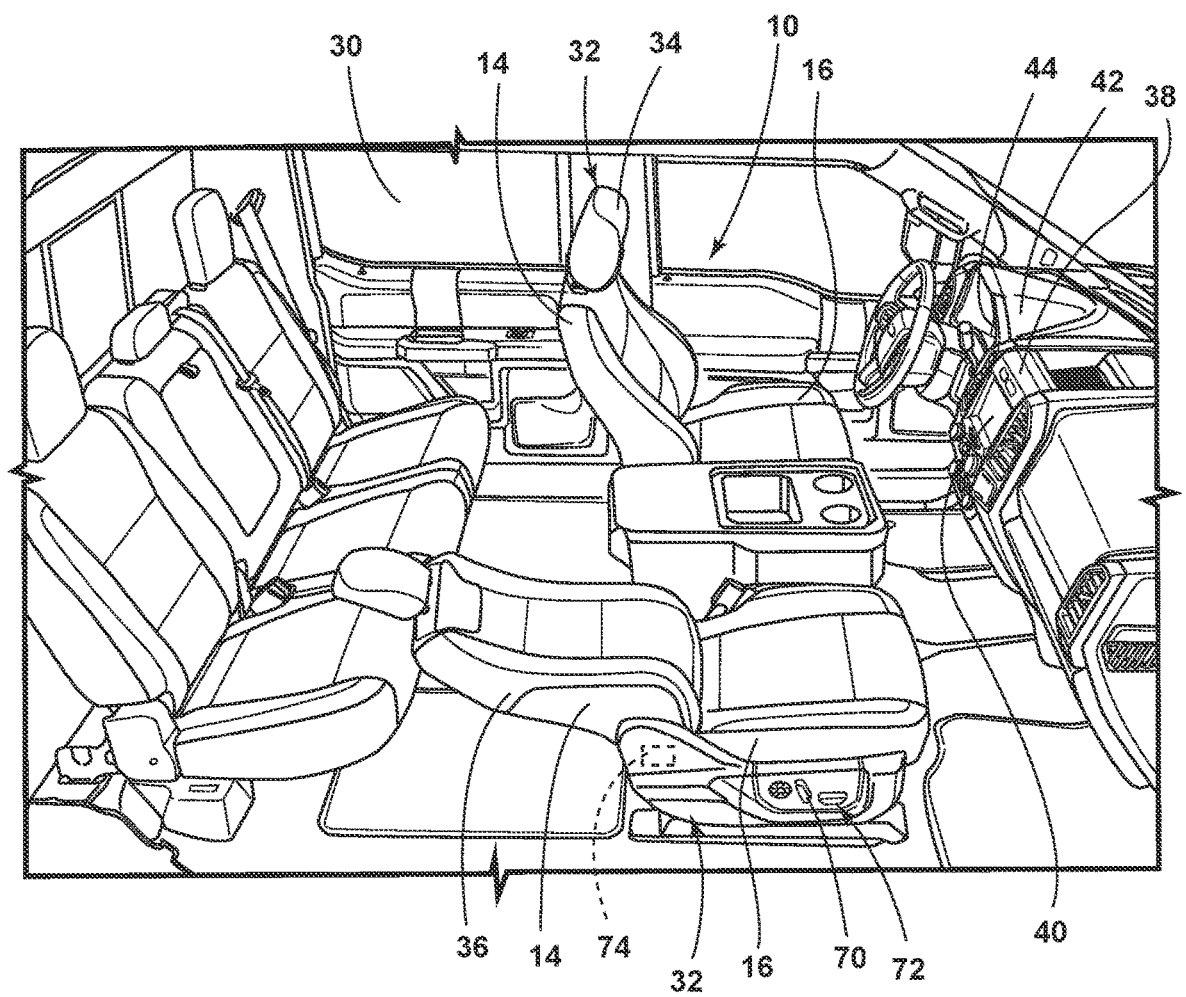
FIG. 2 is a side perspective view of an interior compartment of a vehicle with a passenger seating assembly in a sleeper mode, according to the present disclosure.

Referring to FIGS. 1 and 2, the vehicle 12 has an interior compartment 30 including seating assemblies 32 disposed in one or more seating rows. The seating assemblies 32 include at least a first seat 34, which is generally a driver's seat, and a second seat 36, which is generally a front passenger seat. The first and second seats 34, 36 may be collectively referred to herein at the seating assemblies 32. The first and second seats 34, 36 are disposed in a vehicle-forward portion of the interior compartment 30 proximate a center stack 38 having a display 40. An instrument panel 42 is disposed in the vehicle-forward portion of the vehicle 12, and generally includes an instrument cluster 44 proximate to the first seat 34. The instrument cluster 44 includes instrumentation for conveying information to a driver of the vehicle 12.

The vehicle 12 is illustrated as a truck, however, the vehicle 12 may be any type of vehicle 12, including, but not limited to, a sedan, a sport-utility vehicle, a van, a crossover, etc. The vehicle 12 may be a manually operated vehicle 12 (e.g., operated with a human driver), a fully autonomous vehicle 12 (e.g., operated with no human driver), or partially autonomous vehicle 12 (e.g., operated with or without a human driver). Additionally, the vehicle 12 may be utilized for personal or commercial purposes, such as, for ride providing services (e.g., chauffeuring) or ride-sharing services.

Referring still to FIG. 2, each of the first and second seats 34, 36 is operable between the upright position and the reclined position. The first seat 34 is illustrated in the upright position, and the second seat 36 is illustrated in a maximum reclined position. The seatback 14 is pivotally coupled with the seat base 16 to adjust between the upright position, and various reclined positions, including the maximum reclined positions. When the seatback 14 is in the maximum reclined position, the seatback 14 is generally parallel with a floor of the vehicle 12. Accordingly, the seatback 14 may rotate about 90° relative to a vertical axis when in the maximum reclined position.

When the seatbacks 14 are in the upright position, the first and second seats 34, 36 are in a drive mode. When in the maximum reclined position, one or both of the first and second seats 34, 36 may be utilized in a sleeper mode. The sleeper mode may be advantageous for providing a resting location within the interior compartment 30 of the vehicle 12. Trucks are generally utilized as work vehicles, and those workers may desire a cool or separate space to rest during a lunch break or after work before leaving the work location. The first and second seats 34, 36 may be utilized in the sleeper mode to provide this resting location. The seatback 14 rotating to the maximum reclined position forms a generally flat surface for the occupant to rest or sleep on. It is contemplated that any of the seating assemblies 32 within the vehicle 12 may be operated in the sleeper mode without departing from the teachings herein.

Figure 3:
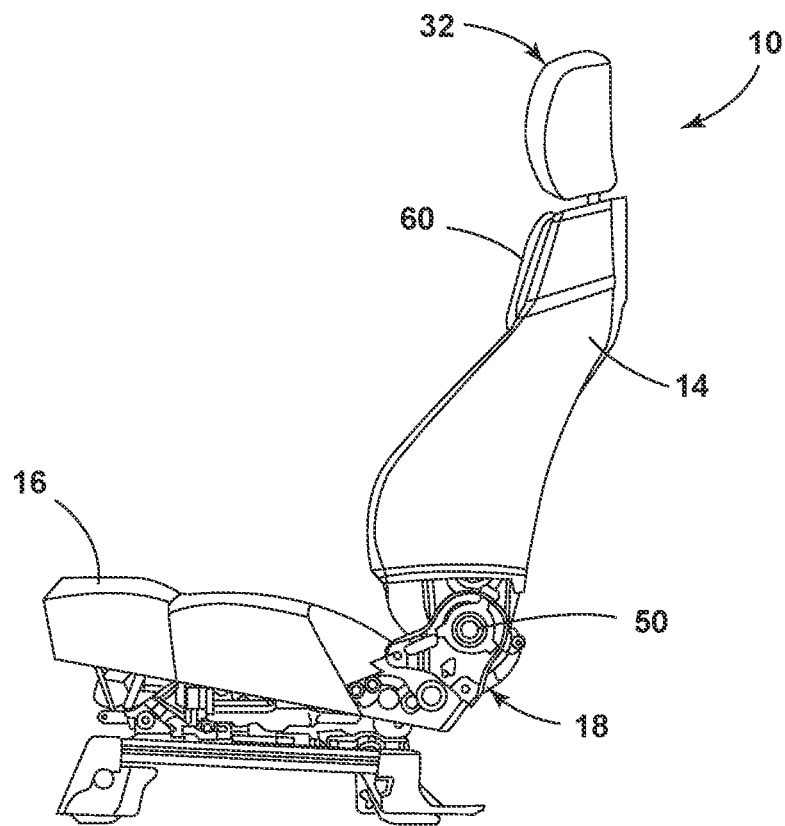
FIG. 3 is a side elevational view of a vehicle seating assembly in an upright position, according to the presentation.
Figure 4:
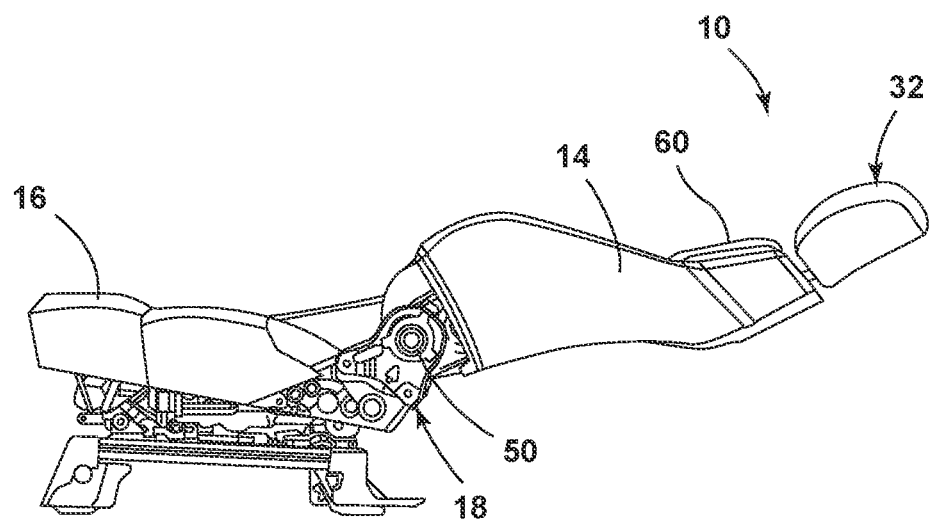
FIG. 4 is a side elevational view of a vehicle seating assembly in a reclined position, according to the present disclosure.
Figure 5:
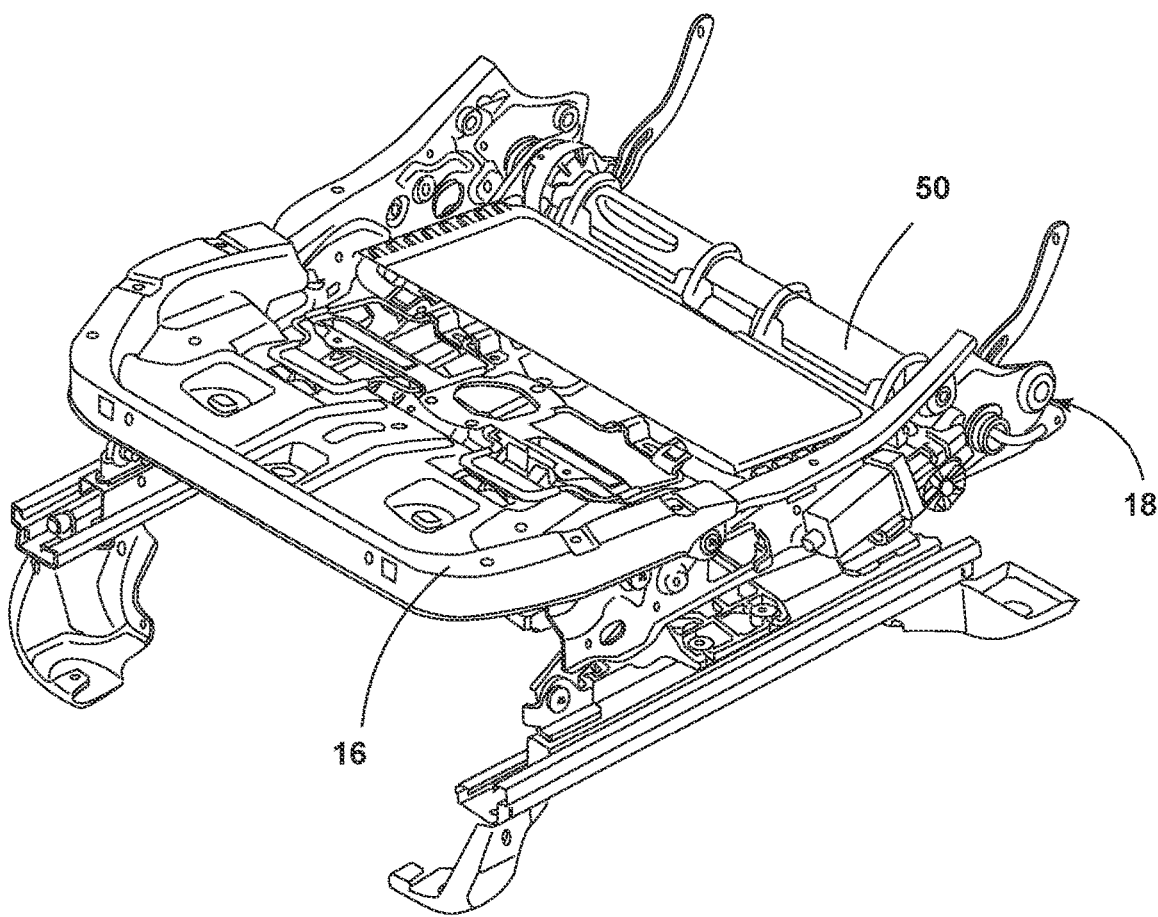
FIG. 5 is a top perspective view of a seat base with a lift assembly, according to the present disclosure.

Referring to FIGS. 3-5, each seating assembly 32 that is adjustable to the sleeper mode includes the lift assembly 18 operably coupled to the seatback 14 and the seat base 16. The lift assembly 18 is generally coupled to a vehicle-rearward edge of the seat base 16 proximate to the seatback 14. The lift assembly 18 includes a lift frame 50 positioned proximate an H-point of the seating assembly 32. The H-point of the seating assembly 32 is a theoretical, relative location of a hip of an occupant that is seated on the seating assembly 32.

The lift assembly 18 is operable between the disengaged position, as illustrated in FIG. 3, and the engaged position, as illustrated in FIG. 4. The lift assembly 18 lifts or adjusts vertically when moving from the disengaged position to the engaged position. It is contemplated that each of the disengaged position and the engaged position include a range of motion or vertical displacement of the lift assembly 18. When the lift assembly 18 is in the disengaged position, the seating assembly 32 is in the drive mode with the seatback 14 in the upright position, as illustrated in FIG. 3. The disengaged position is generally a lowered or resting position. When the lift assembly 18 is in the engaged position, the lift assembly 18 vertically adjusts the lift frame 50 up to a maximum lift position. As illustrated in FIG. 4, when the lift assembly 18 is in the maximum lift position, the seatback 14 is in the maximum reclined position.

The lift frame 50 operates to adjust the vehicle-rearward edge of the seat base 16 (e.g., proximate the seatback 14) vertically upwards to abut a lower edge of the seatback 14 when the seatback 14 is in the maximum reclined position. The lift assembly 18 raises the edge of the seat base 16 to form a continuous, flat surface with the seatback 14. The lift assembly 18 generally provides a vertical displacement in a range from about 80 mm to about 100 mm close a gap between the seat base 16 and the seatback 14 on the seating assembly 32 when the seatback 14 is in the maximum reclined position.

Operation of the lift assembly 18 depends on the position of the seatback 14. For example, the lift assembly 18 may remain in the disengaged position until the seatback 14 reclines to a predetermined angle between the upright position and the maximum reclined position. The predetermined angle may be in a range of from about 45° to about 65° relative to the vertical axis. When the seatback 14 is rotated to the predetermined angle, the lift assembly 18 begins to adjust from the disengaged position to the engaged position. The seatback 14 continues to rotate to the maximum reclined position, and the lift assembly 18 continues to adjust to the maximum lift position. Accordingly, when the seatback 14 is in the maximum reclined position, the lift assembly 18 is in the maximum lift position, thereby adjusting the seating assembly 32 fully to the sleeper mode.

Figure 6:
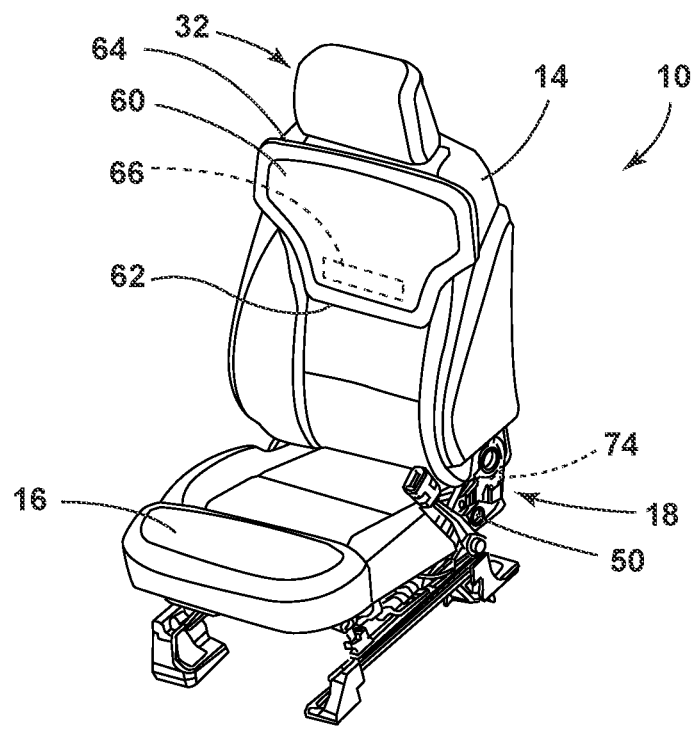
FIG. 6 is a front perspective view of a vehicle seating assembly having an upper bolster, according to the present disclosure.
Figure 7:
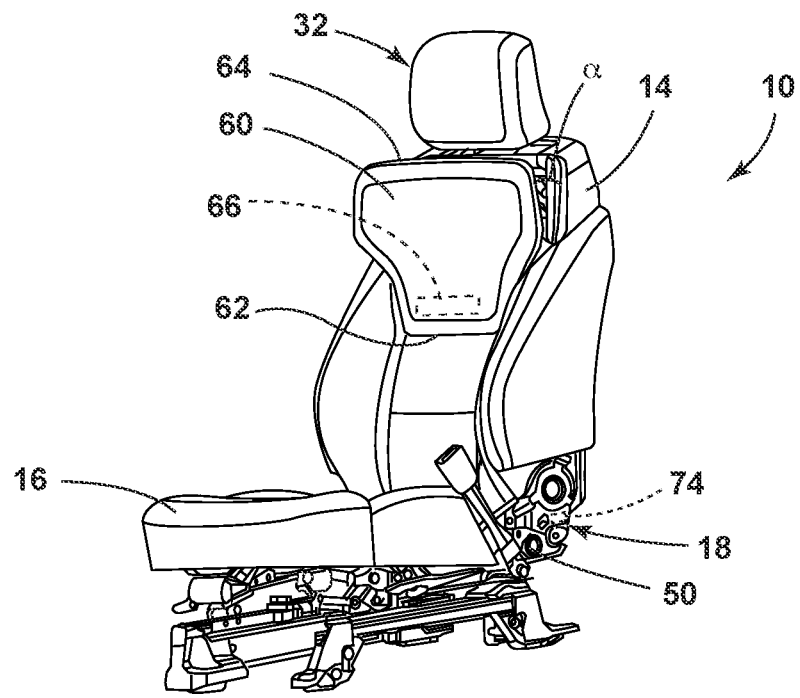
FIG. 7 is a front perspective view of a vehicle seating assembly having an upper bolster, according to the present disclosure.

Referring to FIGS. 6 and 7, the seating assembly 32 may include a bolster 60 coupled to an upper portion of a vehicle-forward side of the seatback 14. The bolster 60 provides neck or upper back support to the passenger when the seating assembly 32 is in the sleeper mode. The bolster 60 is generally aligned with an upper thoracic part of the back of the passenger. The bolster 60 rotates about a rotational axis extending along a bottom edge 62 of the bolster 60. Accordingly, a top edge 64 of the bolster 60 adjusts away from the seatback 14. An angle α is defined between the bolster 60 and a surface of the seatback 14 and may be in a range between about 0° and about 40°. When the angle α is at 0°, the bolster 60 may abut or rest against the surface of the seatback 14, which is advantageous for operating the seating assembly 32 in the drive mode.

The bolster 60 may be manually rotated by the user by grasping the top edge 64 and applying a force in a range from about 10 N to about 60 N to adjust the bolster 60 to the desired angle α. The bolster 60 includes a latching assembly 66 for retaining the bolster 60 at the selected angle α. Generally, the latching assembly 66 provides for a predefined number of lockable positions to give the occupant a range of positions to support the neck while the seating assembly 32 is in the sleeper mode. In a non-limiting example, the bolster 60 may have about five lockable positions between the angle α of 0° and about 15°. The first locking position may be when the bolster 60 abuts the seatback 14, or alternatively, each of the five lockable positions may define an angle α greater than 0° (e.g., the bolster 60 abutting the seatback 14 may not be one of the predefined lockable positions). To return the bolster 60 to the angle α of about 0° to abut the seatback 14, the user manually adjusts the bolster 60 beyond the last lockable position to an angle α between about 20° and 40° to reset the latching assembly 66, allowing the bolster 60 to return to the 0° position (e.g., the abutting position).

Figure 8:
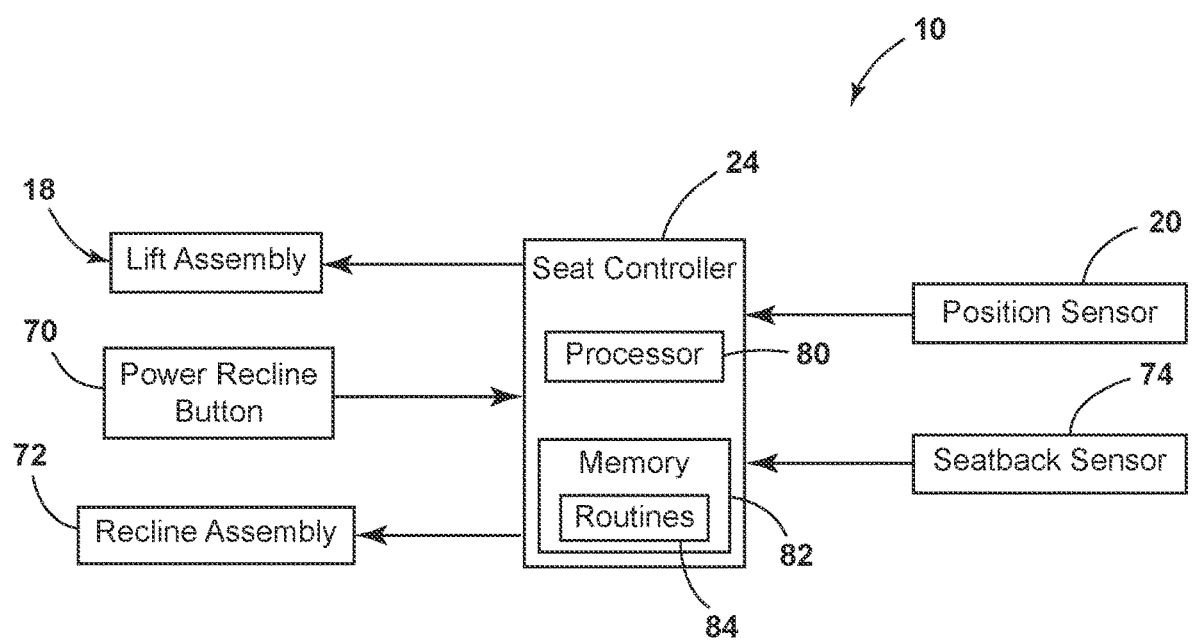
FIG. 8 is a block diagram of a vehicle seating system, according to the present disclosure.

Referring to FIG. 8, as well as FIGS. 3-7, to adjust the seating assembly 32 from the drive mode to the sleeper mode, the passenger engages a power recline button 70 generally located on seat side shield. The power recline button 70 activates a recline assembly 72 that adjusts the seatback 14. The recline assembly 72 generally includes a motor for automatically adjusting the position of the seatback 14. Any practicable configuration of the recline assembly 72 may be included in the seating assembly 32 without departing from the teachings herein. The seating assembly 32 may include a seatback sensor 74 that senses the position or angle of the seatback 14 relative to the vertical axis. When the seatback sensor 74 senses the seatback 14 at the predetermined angle, the lift assembly 18 begins to adjust from the disengaged position to the engaged position. As previously stated, the predetermined angle is generally in a range of from about 45° to about 65° relative to the vertical axis. As the seatback 14 continues to adjust, the lift assembly 18 continues to adjust the seat base 16 vertically upwards. The passenger may continue to engage the power recline button 70 until the seatback 14 is at about 90° relative to the vertical axis, and the lift assembly 18 is in the maximum lift position such that the seating assembly 32 is in the sleeper mode. The passenger may then manually adjust the bolster 60 to the desired latch position.

To return the seating assembly 32 to the drive mode, the passenger adjusts the bolster 60 to abut the seatback 14 (e.g., with the angle α of about 0°). To do so, the passenger may grasp the top edge 64 of the bolster 60 and adjust the bolster 60 to an angle α in a range from about 20° to relative to the seatback 14 to reset the latching assembly 66. The passenger may then adjust the bolster 60 to abut the seatback 14. The passenger may then engage the power recline button to begin adjusting the seatback 14 from the maximum reclined position to the upright position. As the seatback 14 is adjusted to the upright position, the lift assembly 18 moves from the maximum lift position and the engaged position to the disengaged position.

Figure 9:
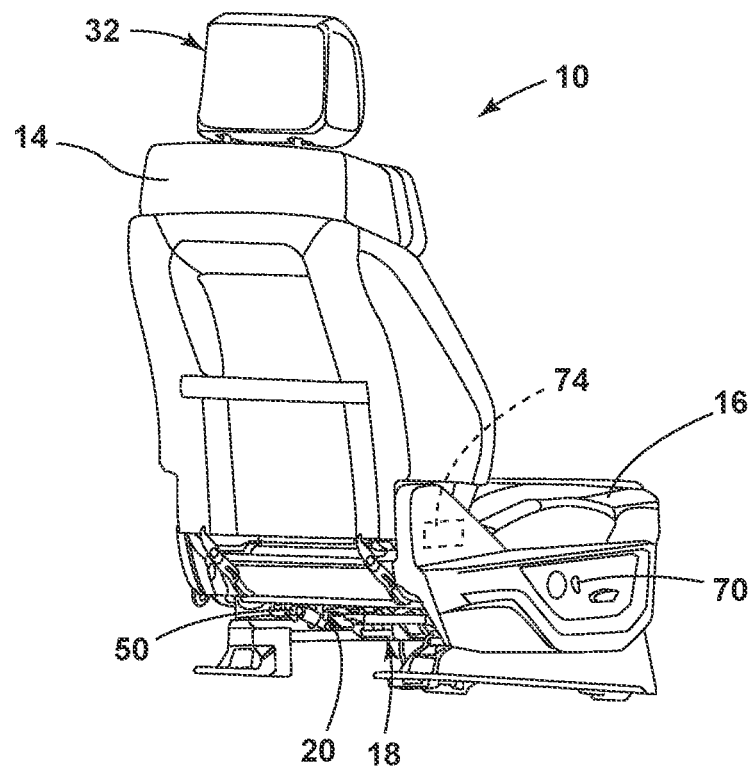
FIG. 9 is a rear perspective view of a vehicle seating assembly, according to the present disclosure.

Referring to FIG. 8, as well as FIG. 9, the seat controller 24 includes a processor 80, a memory 82, and other control circuitry. Instructions routines 84 stores in the memory 82 and executable by the processor 80. The seat controller 24 may be communicatively coupled with the seatback sensor 74, the recline assembly 72, and the power recline button 70 to process the various inputs and generate the selected outputs. The seat controller 24 may include one or more routines 84 related to determining if the seatback 14 is in the upright position and when the seating assembly 32 is in the sleeper mode position based on the position of the lift assembly 18.

Figure 10:
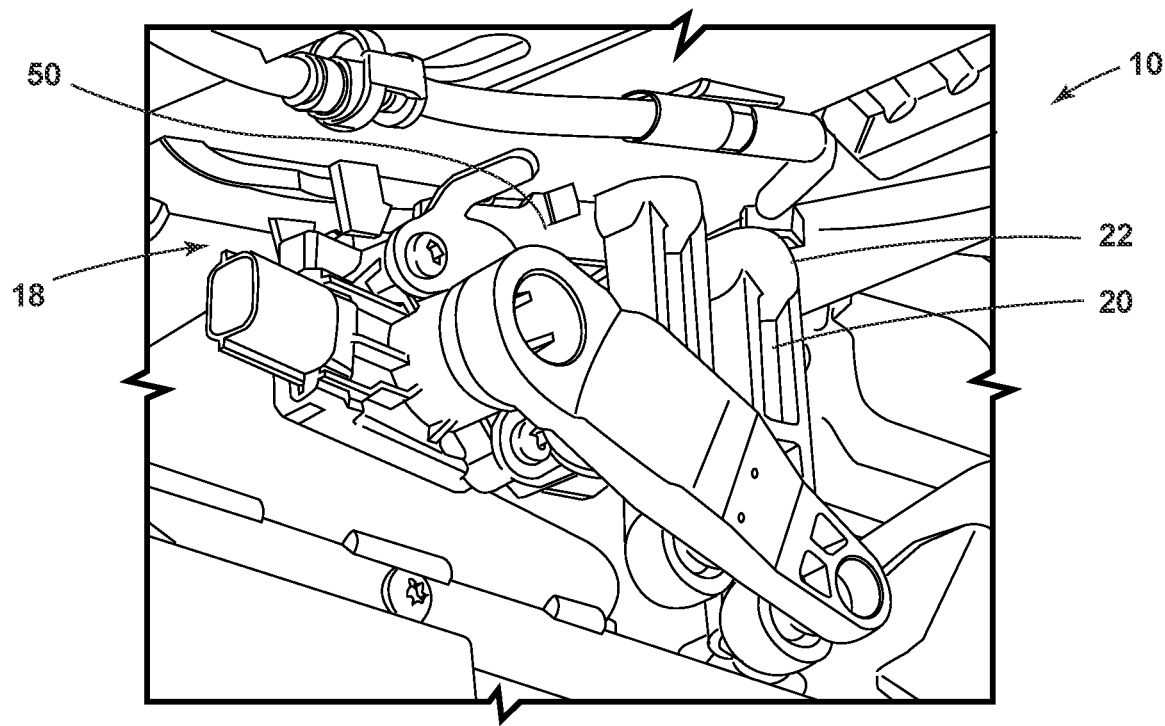
FIG. 10 is an enlarged side perspective view of a position sensor coupled to a lift frame of a lift assembly, according to the present disclosure.
Figure 11:
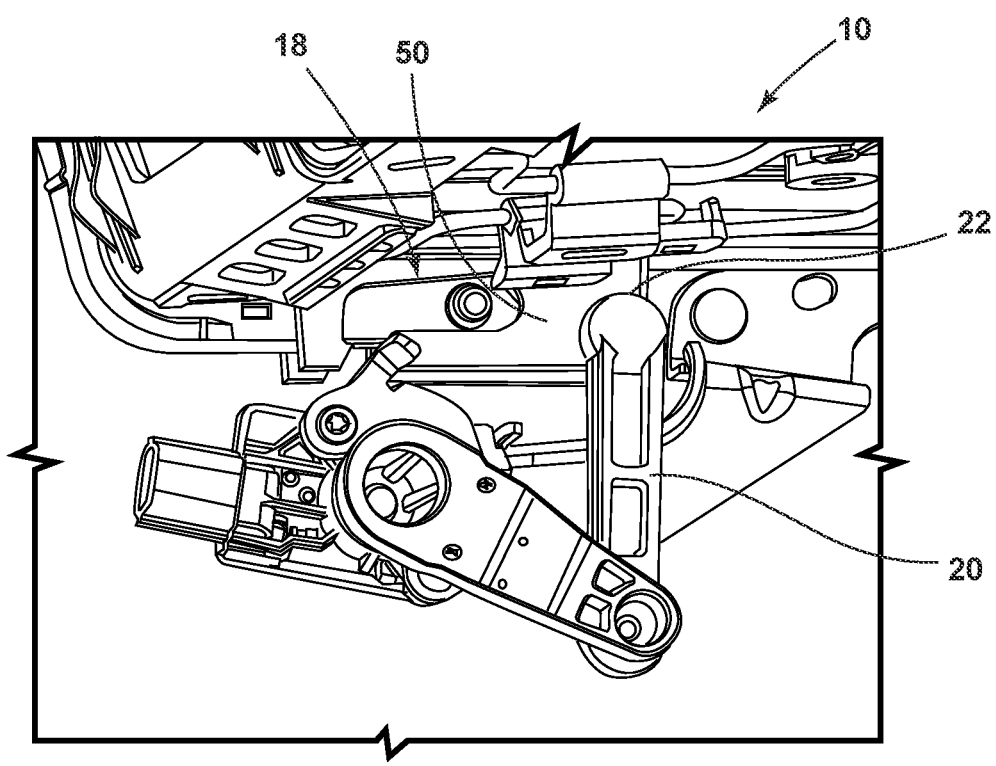
FIG. 11 is an enlarged side perspective view of a position sensor coupled to a lift frame of a lift assembly, according to the present disclosure.

Referring to FIGS. 9-11, the position sensor 20 is coupled to the lift frame 50 of the lift assembly 18. The position sensor 20 is generally disposed in a vehicle-rearward portion of the seating assembly 32 proximate to the vehicle-rearward edge of the seat base 16. The position sensor 20 is coupled to the lift frame 50 via the ball joint 22. The position sensor 20 and the ball joint 22 adjust vertically with the movement of the lift frame 50 as the lift assembly 18 is adjusted between the disengaged in the engaged positions. The ball joint 22 allows the position sensor 20 to move with and separate from the lift assembly 18.

The position sensor 20 generally senses the change in the position of the position sensor For example, the position sensor 20 may be a contactless inductive position sensor, such as the CIPOS® manufactured by Hella KGaA Hueck & Co. Contactless inductive position sensors generally include transmitting and receiving coils on a printed circuit board with an associated rotor and a separate application specific integrated circuit (ASIC). The rotor adjusts separately of the transmitting and receiving coils, allowing the inductive position sensor to sense a change in position or angle between the transmitting and receiving coils and the rotor. The contactless inductive position sensor configuration may be advantageous for being insensitive to mechanical fault tolerances, temperature fluctuations, and magnetic fields. It is contemplated that other configurations of the position sensor 20 may be utilized in the seating system 10 without departing from the teachings herein. The position sensor 20 may provide precise position measurements, measuring the adjusted angle or position of the position sensor 20.

Figure 12:
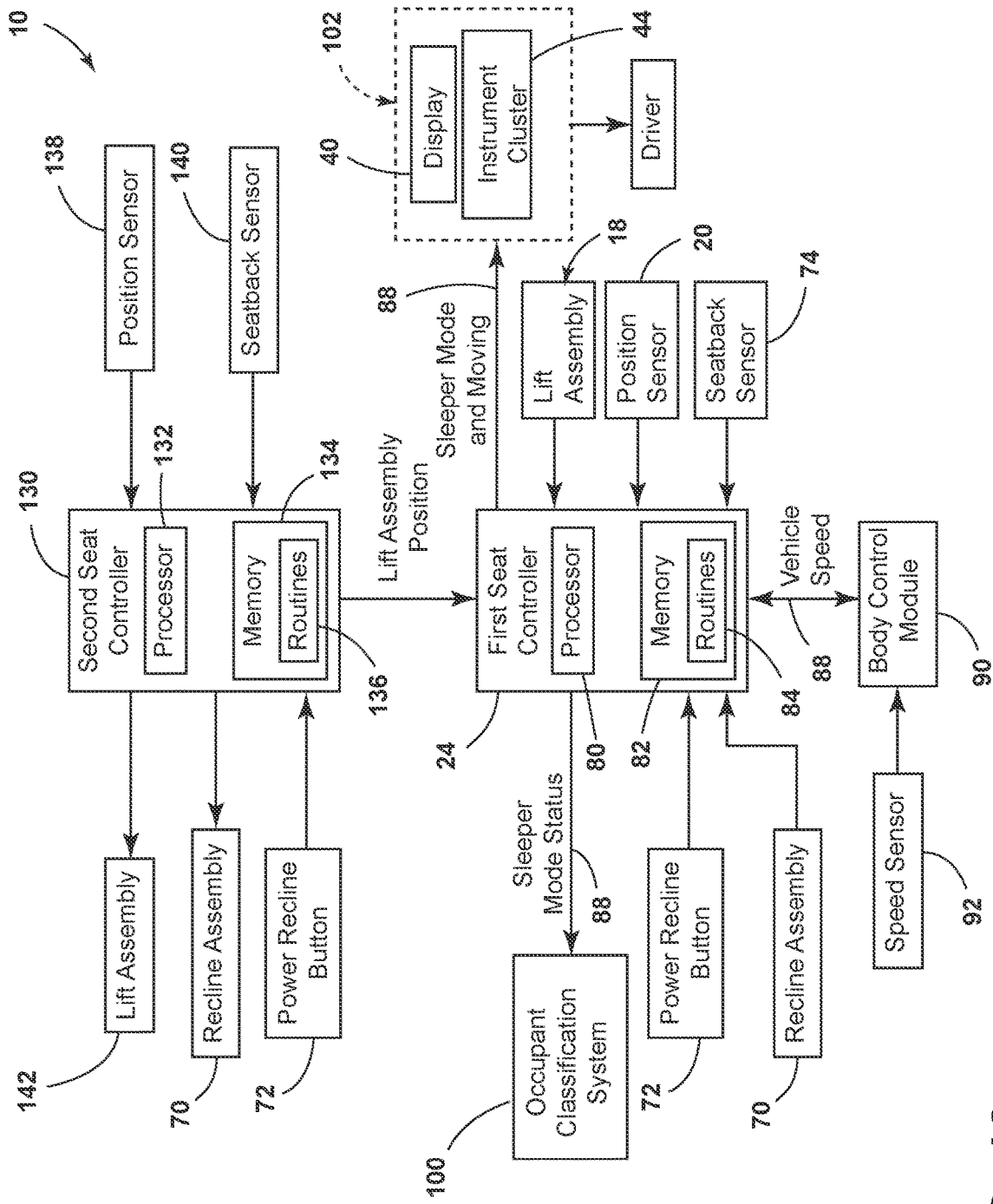
FIG. 12 is a block diagram of a vehicle seating system according to the present disclosure.

Referring still to FIG. 11, as well as FIG. 12, the position sensor 20 is coupled to the lift frame 50 and moves vertically with the adjustment of the lift assembly 18. The position sensor constantly, or periodically, outputs a pulse width modulation (PWM) value to the seat controller 24 indicative of the change in position of the position sensor 20 (e.g., the rotor relative to the transmitting and receiving coils). The seat controller 24 includes one or more routines 84 for receiving the PWM value and interpreting the PWM value to determine a position of the lift assembly 18. The seat controller 24 determines if the lift assembly 18 is in the disengaged position or has been adjusted to the engaged position based on the PWM value received from the position sensor 20. Accordingly, the seat controller 24 may determine the position of the lift assembly 18 in response to position data received from the position sensor 20. The seat controller 24 may include stored PWM values to compare the received PWM value to determine the position of the lift assembly 18. Alternatively, the change in the output from the position sensor may be sufficient to determine the position of the lift assembly 18.

The seat controller 24 may also determine whether the seating assembly 32 is in the drive mode when the seatback 14 is in the upright position. The lift assembly 18 operates to adjust between the disengaged position and the engaged position when the seatback 14 is reclined to the predetermined angle. Therefore, the reclined angle of the seatback 14 may directly correlate with the vertical displacement of the lift assembly 18.

Referring still to FIG. 12, the seat controller 24 may communicate with other controllers and systems through a wireless communication network or controller area network (CAN bus) 88. Through the CAN bus 88, the seat controller 24 may read or determine a vehicle speed. Generally, the seat controller 24 is communicatively coupled with a body control module 90. The body control module 90 is in communication with a speed sensor 92 for determining the vehicle speed. The seat controller 24 may include one or more routines 84 for receiving and processing the vehicle speed. For example, one or more routines 84 may relate to comparing the sensed vehicle speed with a predetermined speed threshold stored in the memory 82.

Through the CAN bus 88, the seat controller 24 may be in communication with an occupant classification system 100 and an alert feature 102. The alert feature 102 may include the display 40 in the center stack 38 and the instrument cluster 44. The seat controller 24 sends an alert signal to the alert feature 102 to notify the driver of the vehicle 12 when certain conditions are met.

Figure 13:
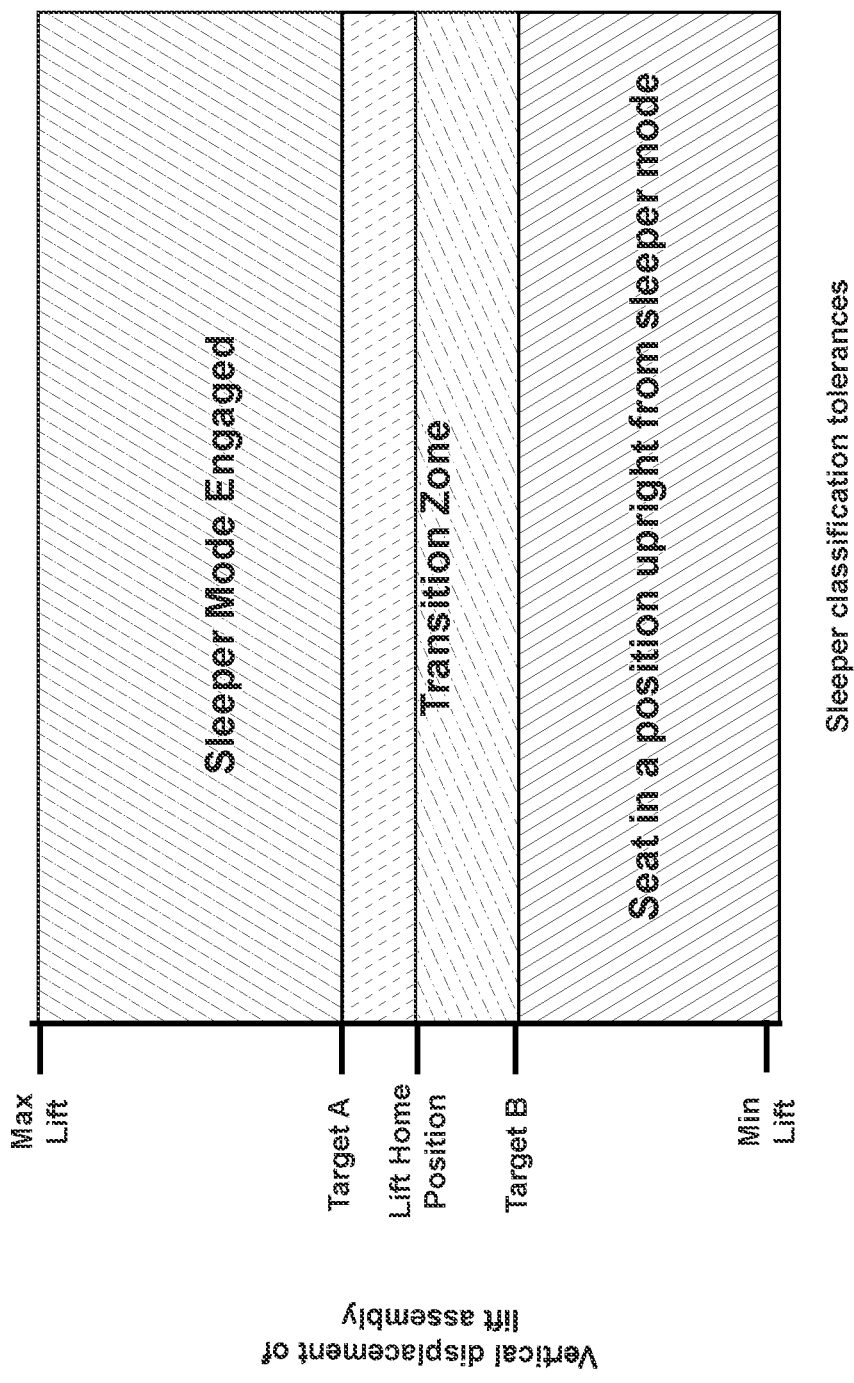
FIG. 13 is a graph illustrating tolerances of separate seating modes conveyed to an occupant classification system, according to the present disclosure.

Referring still to FIG. 12, as well as FIG. 13, the conditions for sending an alert signal relate to the position of the seating assembly 32 (e.g., drive mode v. sleeper mode) and motion of the vehicle 12 (e.g., vehicle speed). The seat controller 24 includes one or more routines 84 for determining whether these two conditions are met to alert the driver of the vehicle 12. The routine 84 begins at step 110 of receiving the position data from the position sensor 20. The seat controller 24 receives the PWM value indicative of a position of the position sensor 20, or the change in the position of the position sensor 20.

After receiving the PWM value, the routine 84 proceeds to the decision step 112 of determining if the lift assembly 18 is in the engaged position. The seat controller 24 interprets the PWM value received from the position sensor 20 to determine if the lift assembly 18 has moved a sufficient vertical displacement to be in the engaged position. In decision step 112, the seat controller 24 may also utilize information received from the seatback sensor 74 to determine if the lift assembly 18 is in the engaged position. For example, the lift assembly 18 adjusts to the engaged position when the seatback 14 reaches the predetermined angle (e.g., generally in a range of about 45° to about 65° relative to the vertical axis). Utilizing the data from the position sensor 20, the seatback sensor 74, or a combination thereof, the seat controller 24 determines whether the lift assembly 18 has lifted into the engaged position. If the seat controller 24 determines that the lift assembly 18 remains in the disengaged position, the routine 84 returns to step 110 for receiving additional position data.

If the seat controller 24 determines in decision step 112 that the lift assembly 18 is in the engaged position, the seat controller 24 then receives the vehicle speed in step 114. The speed sensor 92 communicates the vehicle speed to the body control module 90, and the body control module 90 communicates the vehicle speed to the seat controller 24. In step 116 of the routine 84, the seat controller 24 reads or interprets the vehicle speed. The routine 84 then proceeds to decision step 118 to determine if the vehicle speed is at or above the predetermined speed threshold. The predetermined speed threshold is generally about 3 km/h or about 4 km/h. If the vehicle speed is determined to be below the predetermined speed threshold, the routine 84 returns to step 110 to receive additional position data to monitor the position of the lift assembly 18.

In decision step 118, if the seat controller 24 determines that the vehicle 12 is moving at or above the predetermined speed threshold, the routine 84 proceeds to step 120 of sending the alert signal to the alert feature 102 via the CAN bus 88. In step 122, the seat controller 24 sends a signal to the occupant classification system 100, indicating that the lift assembly 18 is in the engaged position and, consequently, that the seating assembly 32 is in the sleeper mode.

Referring still to FIGS. 12 and 13, the alert feature 102 includes one or both of the instrument cluster 44 and the display 40 on the center stack 38. The alert feature 102 notifies the driver that the seating assembly 32 is in the sleeper mode while the vehicle 12 is moving. The alert feature 102 may provide a visual alert, an audible alert, a tactile alert, or a combination thereof. For example, the visual alert may include a message displayed on the display 40 in the center stack 38. The visual alert may remain displayed until the passenger in the vehicle 12 acknowledges the displayed alert. Additionally or alternatively, the visual alert may be a graphical icon on the instrument cluster 44 that may be illuminated when the seating assembly 32 is in the drive mode and may dim when the seating assembly 32 returns to the drive mode. The audible alert may be a sound emitted by the instrument cluster 44. The instrument cluster 44 may include a speaker that emits a chime or other sound indicating the seating assembly 32 is in the sleeper mode. The audible alert may be emitted at intervals for a predetermined period of time. Additionally or alternatively, the audible alert may be emitted until the seating assembly 32 returns to the drive mode. The alerts may be conveyed to the driver when the seating assembly 32 is in the sleeper mode and the vehicle 12 is moving at or above the predetermined speed threshold.

Figure 14:
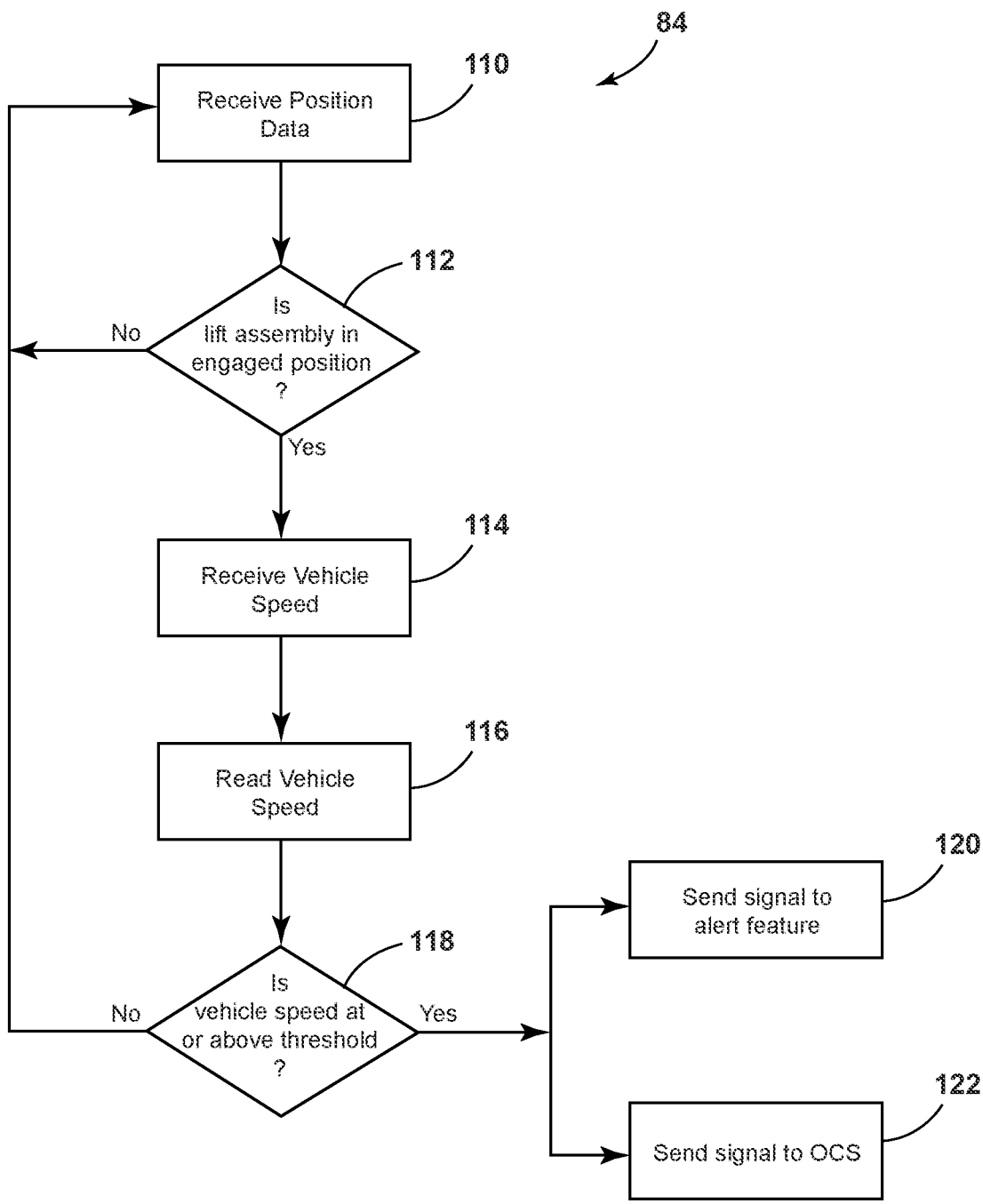
FIG. 14 is a flow diagram of a method of alerting a driver of certain conditions in a vehicle, according to the present disclosure.

Referring still to FIGS. 12 and 13, as well as FIG. 14, the seat controller 24 communicates with the occupant classification system 100 that the seatback 14 is being reclined and the lift assembly 18 is being adjusted to the engaged position. The seating assembly 32 includes the occupant classification system 100, which provides occupant detection. The communication that the seating assembly 32 is in the sleeper mode contributes to the calibration of the occupant classification system 100. The seating assembly 32 may communicate an upright or drive mode signal, for when the seatback 14 is in the upright position and the lift assembly 18 is in the disengaged position, and a sleeper signal, for when the seatback 14 is reclined beyond the predetermined angle and the lift assembly 18 is in the engaged position.

As previously stated, the seat controller 24 may determine if the seating assembly 32 is in the sleeper mode based on the position of the lift assembly 18 and position sensor 20. To account for tolerances, occupant mass, and vibrational inputs into the seating assembly 32, the position sensor 20 may have two distinct PWM values that are communicated to the seat controller 24 based on the movement of the seatback 14. The first PWM value defines when the seating assembly 32 is being transitioned from the drive mode (e.g., upright) into the sleeper mode (e.g., reclined), and the second PWM value defines when the seating assembly 32 is transitioning from the sleeper mode into the drive mode. During the adjustment between the drive mode and the sleeper mode, there is a certain vertical displacement relative to a minimum vertical displacement in which the lift assembly 18 switches from the disengaged position to the engaged position (e.g., a switch position or home position). However, to account for the tolerances, occupant mass, and vibrational inputs, there is a transition zone that is defined by two predefined target values.

When seating assembly 32 is adjusting from the drive mode into the sleeper mode, the vertical displacement of the lift assembly 18 extends from the minimum value to a target value A. When seating assembly 32 is adjusting from the sleeper mode into the drive mode, the vertical displacement of the lift assembly 18 extends from the maximum lift position to a target value B. Generally, the target value A is a greater vertical displacement than target value B. The switch position, where the lift assembly 18 switches between the drive mode and the sleeper mode, is between the two predefined target values. The occupant classification system 100 defines the predefined target values based on various tolerance inputs to the occupant classification system 100. The communication between the seat controller 24 and the occupant classification system 100 that the seating assembly 32 is in the sleeper mode provides calibration for the occupant classification system 100

Referring still to FIGS. 12-14, the seating system 10 may include both the first and second seats 34, 36. It is contemplated that different protocols may be utilized for the first seat 34 (e.g., the driver's seat) compared to the second seat 36 (e.g., the front passenger seat). Accordingly, the first seat 34 may operate differently than the second seat 36 under certain circumstances (e.g., vehicle start, driving, etc.). The seat controller 24 may be associated with the first seat 34 (e.g., the driver's seat) and may be in communication with a second seat controller 130, which may be associated with the second seat 36 (e.g., the front passenger seat) of the vehicle 12. The seat controller 130 includes a processor 132, a memory 134, and other control circuitry. Instructions routines 136 are stored in the memory 134 and executable by the processor 132. The seat controller 130 may be in communication with a position sensor 138 and a seatback sensor 140 associated with the second seat 36. The position sensor 138 may be coupled to a lift assembly 142 via the ball joint 22. The first seat 34 and the second seat 36 may operate in a manner as previously described herein with respect to the seating assembly 32.

The seat controller 130 of the second seat 36 is in communication with the seat controller 24 of the first seat 34. Accordingly, the seat controller 24 may monitor the position of the second seat 36 to determine whether the second seat 36 is in the drive mode or the sleeper mode. In step 110 of the routine 84, as illustrated in FIG. 14, the position data received by the seat controller 24 may be the position data of the position sensor 20 and the lift assembly 18 of the first seat 34, as well as the position data of the position sensor 138 and the lift assembly 142 of the second seat 36. The seat controller 24 may, therefore, send the alert signal to the alert feature 102 when one or both of the first and second seats 34, 36 are in the sleeper mode and the vehicle 12 is moving at or above a predetermined speed threshold.

Figure 15:
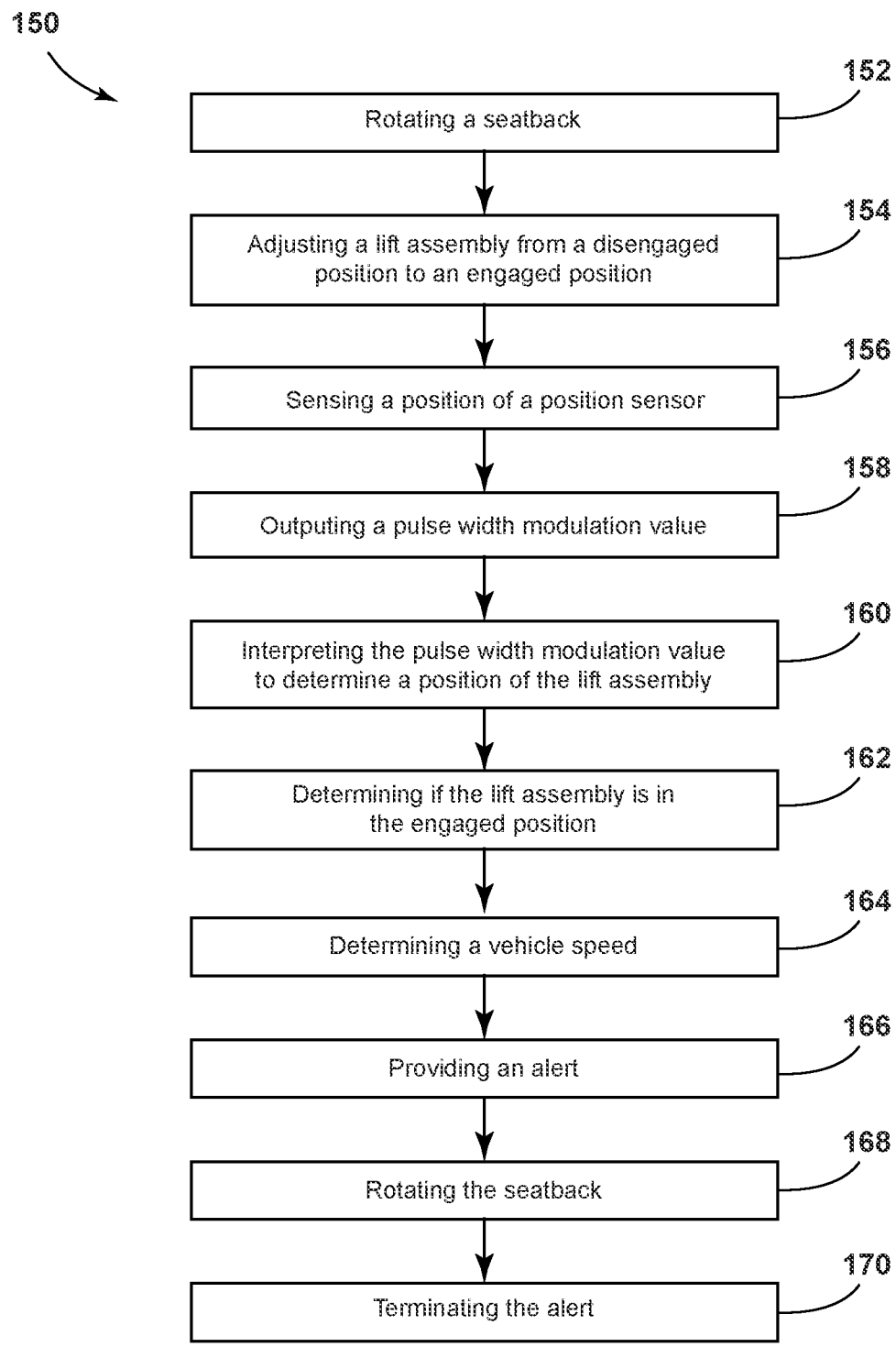
FIG. 15 is a flow diagram of a method of alerting a driver of certain conditions in a vehicle, according to the present disclosure.

Referring to FIG. 15, with further reference to FIGS. 1-14, a method 150 of alerting the driver or other passenger of the vehicle 12 of a seat position includes step 152 of rotating the seatback 14 of one or both of the first and second seats 34, 36 toward the maximum reclined position. The passenger or occupant may engage the power recline button 70 to activate the recline assembly 72. In step 154, the lift assembly 18 is adjusted from the disengaged position to the engaged position. The lift assembly 18 generally begins adjusting to the engaged position when the seatback 14 has been rotated to the predetermined angle. Generally, the predetermined angle is in a range from about 45° to about 65° relative to the vertical axis. In step 154, the seatback 14 may continue to rotate and the lift assembly 18 may continue to raise the seat base 16 until the first seat 34 is fully in the sleeper mode. Additionally, in step 154, the lift assembly 142 is adjusted from the disengaged position to the engaged position in response to the rotation of the seatback 14 of the second seat 36. The second seat 36 may also be adjusted fully to the sleeper mode. In step 154, the passenger may manually adjust the bolster 60 to the selected lockable position for additional neck support.

In step 156, the position sensor 20 outputs the PWM value indicative of the position of the position sensor 20. The position sensor 20 adjusts with the lift assembly 18 and the constant output of the PWM value conveys the change in position. Additionally, in step 156, the position sensor 138 may convey the PWM value to the seat controller 130 of the second seat 36.

In step 158, the seat controller 24 receives the position data (e.g., the PWM value) from the position sensor 20 and interprets the position data. The seat controller 24 utilized the PWM value to determine the position of the lift assembly 18. Further, the seat controller 24 determines if the lift assembly 18 is in the engaged position. Additionally or alternatively, the seat controller 130 of the second seat 36 may also interpret the PWM value from the position sensor 138 to determine the position of the lift assembly 142. The seat controller 130 may then communicate information relating to the position of the lift assembly 142 to the seat controller 24. Further, in step 158, each of the seat controllers 24, 130 may utilize information from the respective seatback sensors 74, 140 to determine the position of the lift assembly 18, 142, respectively.

In step 160, the seat controller 24 may determine the vehicle speed. The body control module 90 may receive information from the speed sensor 92 regarding the speed at which the vehicle 12 is moving. The body control module 90 may communicate this information to the seat controller 24 via the CAN bus 88.

In step 162, if the seat controller 24 determines that one or both of the lift assemblies 18, 142 are in the engaged position and the vehicle 12 is moving at or above a predetermined speed threshold, the seat controller 24 communicates the alert signal to the alert feature 102 via the CAN bus 88. In step 162, the seat controller 24 may also communicate the signal to the occupant classification system 100 indicating that one or both of the first and second seats 34, 36 is in the sleeper mode. The indication provided to the occupant classification system 100 is advantageous for adjusting calibration curves stored within the occupant classification system 100. The indication that one or both of the first and second seats 34, 36 is in the sleeper mode assists the occupant classification system 100 in maintaining precision of the seating system 10 over a period of time. The occupant classification system 100 may include one or more algorithms or routines that may be updated when the seat controller 24 communicates that the first and second seats 34, 36 are in the sleeper mode.

In step 166, the alert feature 102 provides an alert to the driver or other passengers of the vehicle 12 when one or both of the lift assemblies 18, 142 are in the engaged position and the vehicle 12 is moving. The alert may include graphics or words such as "return the passenger seat to upright position." The visual alert may indicate which of the first and second seats 34, 36 have the lift assembly 18, 142 in the engaged position. The visual alert may also be provided on the instrument cluster 44. The alert feature 102 may also provide the audible alert. The instrument cluster 44 may emit the audible alert, such as a chime. Use of both the visual and audible alert may be advantageous to prevent confusion as to what the audible alert is indicating.

In step 168, the first or second seat 34, 36 in the sleeper mode is returned to the drive mode. The seatback 14 of the first seat 34 or the second seat 36 is rotated to the upright position using the recline assembly 72. Once the seatback 14 has reached the predetermined angle, the lift assemblies 18, 142 may adjust from the engaged position to the disengaged position.

In step 170, when the lift assemblies 18, 142 are both in the disengaged position, the alert may be automatically terminated. The position sensors 20, 138 may continue to output the PWM values to the respective seat controller 24, 130, and the seat controllers 24, 130 interpret the PWM values to determine the position of the lift assemblies 18, 142. The seat controller 24 may communicate with the alert feature 102 to terminate the alert when the lift assemblies 18, 142 have returned to the disengaged position. In various aspects, the graphical icon on the instrument cluster 44 may dim. In step 170, the visual alert may remain on the display 40 until the visual alert is acknowledged by the passenger. To acknowledge the visual alert, the driver or passenger may press a button or touch feature associated with the display 40. In another example, the audible alert may cease. It is also contemplated that the audible alert may terminate after a predetermined amount of time has elapsed. It will be understood that the steps of the method 150 may be performed in any order, simultaneously, and/or omitted without departing from the teachings provided herein.

Use of the present device may provide for a variety of advantages. For example, one or both of the seating assemblies 32 may be used in the sleeper mode to provide a resting location within the vehicle 12. Additionally, the lift assemblies 18, 142 may vertically adjust the respective seat base 16 to provide a flat surface with the respective seatback 14. Also, the bolster may be adjusted to different predefined angles α (e.g., different lockable positions) relative to the respective seatback 14 to provide comfort to the neck of the occupant. Additionally, the seat controller 24 may determine the vehicle speed. Further, the seating system 10 includes the seat controller 24 communicatively coupled with the alert feature 102. Moreover, the alert feature 102 may provide at least one of the audible alert and the visual alert to indicate to the driver of the vehicle 12 that one or both of the lift assemblies 18, 142 are in the engaged position. Also, the seat controller 24 generally provides the alert through the alert feature 102 when one or both of the seating assemblies 32 are in the sleeper mode and the vehicle 12 is moving at or above the predetermined speed threshold. Further, the alert feature 102 may be manually or automatically terminated when both seating assemblies 32 are returned to the drive mode. Additional benefits or advantages of using this device may also be realized and/or achieved.

According to one example, a vehicle seating system includes a seatback pivotally coupled to a seat base. The seatback is operable between an upright position and a reclined position. A lift assembly is operably coupled to the seat base. The lift assembly is operable between a disengaged position and an engaged position. A position sensor is coupled to the lift assembly via a ball joint, wherein the ball joint and the position sensor adjust with movement of the lift assembly. A seat controller communicatively is coupled to the position sensor, wherein the seat controller determines if the lift assembly is in the disengaged position or has moved to the engaged position based on position data received from the position sensor. Embodiments of the present disclosure may include one or a combination of the following features:

the seat controller determines a vehicle speed from a controller area network;

the seat controller activates at least one alert when the vehicle speed is at or above a predetermined speed threshold and the lift assembly is in the engaged position;

the at least one alert includes a visual alert and an audible alert;

an alert feature is communicatively coupled to the seat controller, wherein the seat controller communicates an alert signal to the alert feature;

the alert feature displays a visual alert and emits an audible alert in response to the alert signal; and the seat controller determines a position of the lift assembly in response to the position data from the position sensor, and wherein the position data includes a pulse width modulation value.

According to another example, a seat system for a vehicle includes at least one lift assembly operable between a disengaged position and an engaged position. At least one position sensor is coupled to the at least one lift assembly to sense a position of the at least one lift assembly, wherein the at least one position sensor is adjusted with adjustment of the lift assembly. A seat controller is communicatively coupled with the at least one position sensor, wherein the seat controller determines a position of the at least one lift assembly in response to position data received from the at least one position sensor and a vehicle speed. The seat controller communicates an alert signal when the vehicle speed is at or above a predetermined speed threshold and the at least one lift assembly is in the engaged position. Embodiments of an aspect of the present disclosure can include any one or a combination of the following features:

- a seatback is pivotally coupled to a seat base, wherein the seatback is operable between an upright position and a reclined position, and wherein the at least one lift assembly is in the engaged position when the seatback is in the reclined position;
- the at least one position sensor is coupled to a frame of the at least one lift assembly via a ball joint, and wherein the ball joint and the at least one position sensor adjust with the at least one lift assembly;
- an instrument cluster is communicatively coupled to the seat controller, wherein the alert signal is communicated to the instrument cluster;
- the instrument cluster displays a visual alert and emits an audible alert in response to the alert signal;
- a sensor operably is coupled to a seatback, wherein the sensor senses an angle of the seatback, and wherein the at least one lift assembly adjusts to the engaged position when the seatback is at a predetermined angle;
- the at least one lift assembly includes a first lift assembly operably coupled to a first seat base and a second lift assembly operably coupled to a second seat base, and wherein the at least one position sensor includes a first position sensor coupled to the first lift assembly via a ball joint and a second position sensor operably coupled to the second lift assembly via a ball joint; and
- each of the first and second position sensors communicate the position data to the seat controller.

According to yet another example, a method of alerting a passenger of seat positioning includes rotating a seatback to a predetermined angle and adjusting a lift assembly from a first position to a second position when the seatback reaches the predetermined angle. A position of a position sensor coupled to the lift assembly is sensed. Whether the lift assembly is in the second position is determined. A vehicle speed is determined. At least one of a visual alert and an audible alert is provided when the lift assembly is in the second position and the vehicle speed is at or above a predetermined speed threshold. Embodiments of an aspect of the present disclosure can include any one or a combination of the following features:

- the step of providing at least one of the visual alert and the audible alert includes emitting the audible alert via an instrument cluster;
- terminating the audible alert when at least one of a predetermined period of time has elapsed and the lift assembly is returned to the first position;
- the step of providing at least one of the visual alert and the audible alert includes displaying the visual alert via an instrument cluster; and
- outputting a pulse width modulation value indicative of the position of the position sensor; and interpreting the pulse width modulation value to determine a position of the lift assembly.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It should be noted that the sensor examples discussed above might include computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Examples of the present disclosure may be implemented in further types of devices, as would be known to persons skilled in the relevant art(s).

The various illustrative logical blocks, modules, controllers, and circuits described in connection with the embodiments disclosed herein may be implemented or performed with application specific integrated circuits (ASICs), field programmable gate arrays (FPGAs), general purpose processors, digital signal processors (DSPs) or other logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating system, comprising:
a seatback having a top end and a bottom end, wherein the seatback is operable between an upright position and a reclined position;
a seat base operably coupled to the seatback, wherein the seat base includes a front end and a rear end that is positioned in a vehicle-rearward direction relative to the front end and proximate to the bottom end of the seatback;
a lift assembly operably coupled to the seat base, wherein the lift assembly is vertically operable between a disengaged position and an engaged position to vertically adjust the rear end of the seat base relative to the bottom end of the seatback, the rear end of the seat base being adjusted toward the bottom end when the lift assembly is in the engaged position;
a position sensor coupled to the lift assembly via a ball joint, wherein the position sensor and the ball joint adjust with vertical movement of the lift assembly; and
a seat controller in communication with the position sensor, wherein the seat controller determines a position of the lift assembly in response to position data received from the position sensor.

2. The vehicle seating system of claim 1, wherein the lift assembly includes a lift frame, and wherein the lift frame operates to vertically adjust the rear end of the seat base to abut the bottom end of the seatback when the seatback is in the reclined position.

3. The vehicle seating system of claim 1, wherein the lift assembly is in the disengaged position when the seatback is in the upright position.

4. The vehicle seating system of claim 1, wherein the seat controller is communicatively coupled to a speed sensor to determine a vehicle speed.

5. The vehicle seating system of claim 4, wherein the seat controller communicates at least one of a visual alert and an audible alert when the vehicle speed exceeds a predetermined speed threshold and the lift assembly is in the engaged position.

6. The vehicle seating system of claim 5, wherein the seat controller is communicatively coupled with an instrument cluster, and wherein the at least one of the visual alert and the audible alert is communicated to the instrument cluster.

7. A seat system for a vehicle, comprising:
at least one seat base including a forward edge and a rearward edge;
at least one seatback operably coupled to the at least one seat base, wherein a lower end of the at least one seatback is positioned proximate to the rearward edge of the at least one seat base;
at least one lift assembly vertically operable between a disengaged position and an engaged position to vertically adjust the rearward edge of the at least one seat base relative to the lower end of the at least one seatback, the engaged position being vertically above the disengaged position;
at least one position sensor coupled to a frame of the at least one lift assembly via at least one ball joint to sense a position of the at least one lift assembly, the frame being disposed proximate the rearward edge of the at least one seat base, wherein the at least one position sensor and the at least one ball joint are adjusted with adjustment of the at least one lift assembly; and
a seat controller communicatively coupled with the at least one position sensor, wherein the seat controller determines the position of the at least one lift assembly in response to position data received from the at least one position sensor and a vehicle speed, and wherein the seat controller communicates an alert signal when the vehicle speed is at or above a predetermined speed threshold and the at least one lift assembly is in the engaged position.

8. The seat system of claim 7, wherein the at least one seatback is pivotally coupled to the at least one seat base, wherein the at least one seatback is operable between an upright position and a reclined position, and wherein the at least one lift assembly is in the engaged position when the at least one seatback is in the reclined position.

9. The seat system of claim 7, further comprising:
an instrument cluster communicatively coupled to the seat controller, wherein the alert signal is communicated to the instrument cluster.

10. The seat system of claim 9, wherein the instrument cluster displays a visual alert and emits an audible alert in response to the alert signal.

11. The seat system of claim 7, further comprising:
a sensor operably coupled to the at least one seatback, wherein the sensor senses an angle of the at least one seatback, and wherein the at least one lift assembly adjusts to the engaged position when the at least one seatback is at a predetermined angle.

12. The seat system of claim 7, wherein the at least one lift assembly includes a first lift assembly and a second lift assembly and the at least one seat base includes a first seat base and a second seat base, and wherein the first lift assembly is operably coupled to the first seat base and the second lift assembly is operably coupled to the second seat base, and wherein the at least one ball joint includes a first ball joint and a second ball joint, and further wherein the at least one position sensor includes a first position sensor coupled to the first lift assembly via the first ball joint and a second position sensor operably coupled to the second lift assembly via the second ball joint.

13. The seat system of claim 12, wherein each of the first and second position sensors communicate the position data to the seat controller.

14. A method of alerting a passenger of seat positioning, comprising:

positioning a frame of a lift assembly proximate to a rearward edge of a seat base;

rotating a seatback to a first predetermined angle;

vertically adjusting the lift assembly from a first position to a second position when the seatback reaches the first predetermined angle;

vertically adjusting the lift assembly from the second position to a third position as the seatback is rotated from the first predetermined angle to a second predetermined angle, the second predetermined angle greater than the first predetermined angle;

rotating the seat base to vertically adjust the rearward edge of the seat base with the lift assembly to adjust a gap between the rearward edge of the seat base and a bottom edge of the seatback, the rearward edge of the seat base being closer to the bottom edge compared to a front edge of the seat base;

adjusting a position sensor vertically with movement of the frame as the lift assembly is adjusted, wherein the position sensor is coupled to the frame of the lift assembly via a ball joint;

sensing a position of the position sensor coupled to the lift assembly;

determining if the lift assembly is in the third position;

determining a vehicle speed; and providing at least one of a visual alert and an audible alert when the lift assembly is in the third position and the vehicle speed is at or above a predetermined speed threshold.

15. The method of claim 14, wherein the step of providing at least one of the visual alert and the audible alert includes emitting the audible alert via an instrument cluster.

16. The method of claim 15, further comprising:
terminating the audible alert when at least one of a predetermined period of time has elapsed and the lift assembly is returned to the first position.

17. The method of claim 14, wherein the step of providing at least one of the visual alert and the audible alert includes displaying the visual alert via an instrument cluster.

18. The method of claim 14, further comprising:
outputting a pulse width modulation value indicative of the position of the position sensor; and
interpreting the pulse width modulation value to determine a position of the lift assembly.

19. The method of claim 14, wherein the step of rotating the seat base to vertically adjust the rearward edge of the seat base includes vertically adjusting the rearward edge of the seat base with the lift assembly to abut the bottom edge of the seatback.

* * * * *